United States Patent [19]

Mueller et al.

[11] Patent Number: 4,803,481
[45] Date of Patent: Feb. 7, 1989

[54] ASYNCHRONOUS COMMUNICATIONS SYSTEM

[75] Inventors: Peter W. Mueller, Redford; Jack M. Leason, Royal Oak, both of Mich.

[73] Assignee: Peaktronics, Inc., Royal Oak, Mich.

[21] Appl. No.: 33,050

[22] Filed: Mar. 30, 1987

[51] Int. Cl.$^4$ .............................. H04Q 1/00
[52] U.S. Cl. .......................... 340/825.5; 370/91
[58] Field of Search ........... 370/29, 85, 91, 92, 370/93, 94, 100, 32; 340/825.5, 825.52, 825.51, 825.59, 825.42, 825.2, 825.21, 825.14, 825.06, ; 375/113, 108, 106

[56] References Cited

U.S. PATENT DOCUMENTS

| | | | |
|---|---|---|---|
| 3,721,763 | 3/1973 | Homan et al. | 370/29 |
| 3,940,558 | 2/1976 | Gabbard et al. | 375/108 X |
| 4,282,493 | 8/1981 | Moreau | 375/108 X |
| 4,328,586 | 5/1982 | Hansen | 370/32 X |
| 4,454,383 | 6/1984 | Judd | 375/113 X |

OTHER PUBLICATIONS

George E. Friend et al. *Understanding Data Communications*, First Ed., A Howard W. Sams & Co. Publication, 1984.

*Primary Examiner*—Ulysses Weldon
*Attorney, Agent, or Firm*—Harness, Dickey & Pierce

[57] ABSTRACT

The communications system uses a master line, a slave line and at least one call line to effect true asynchronous communication. A protocol is established whereby a master unit takes control of the call line when the master line and slave line are at the same logical state. The slave unit has control of the call line when the master line and slave line are at different logical states. The system includes an interchange device which routes communications signals in accordance with channel identification commands sent over the communications system. The communications scheme can be implemented on a wide variety of digital communicating devices through the use of a universal command instruction set which provides the data manipulation functions required by most microprocessors.

38 Claims, 8 Drawing Sheets

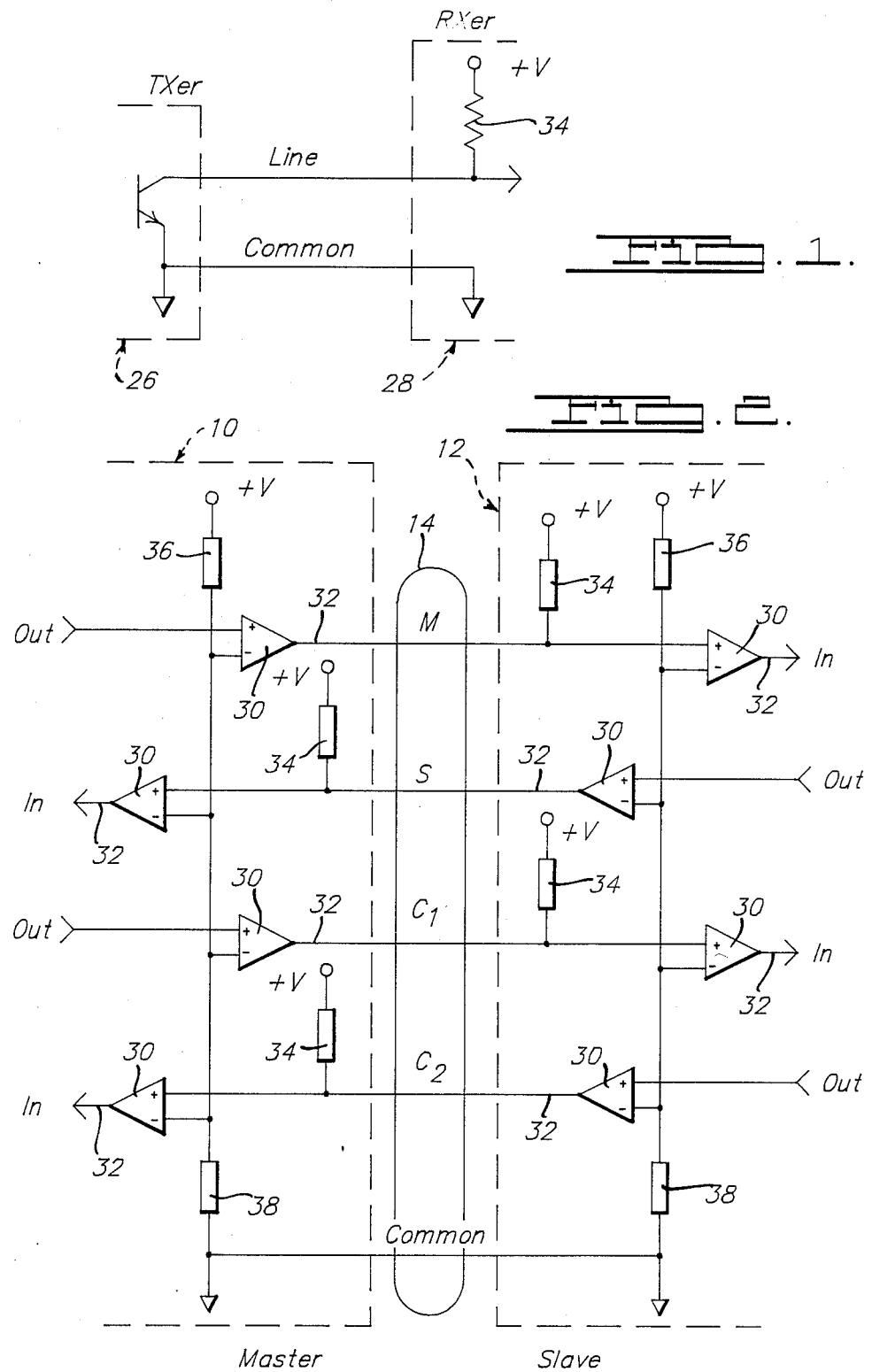

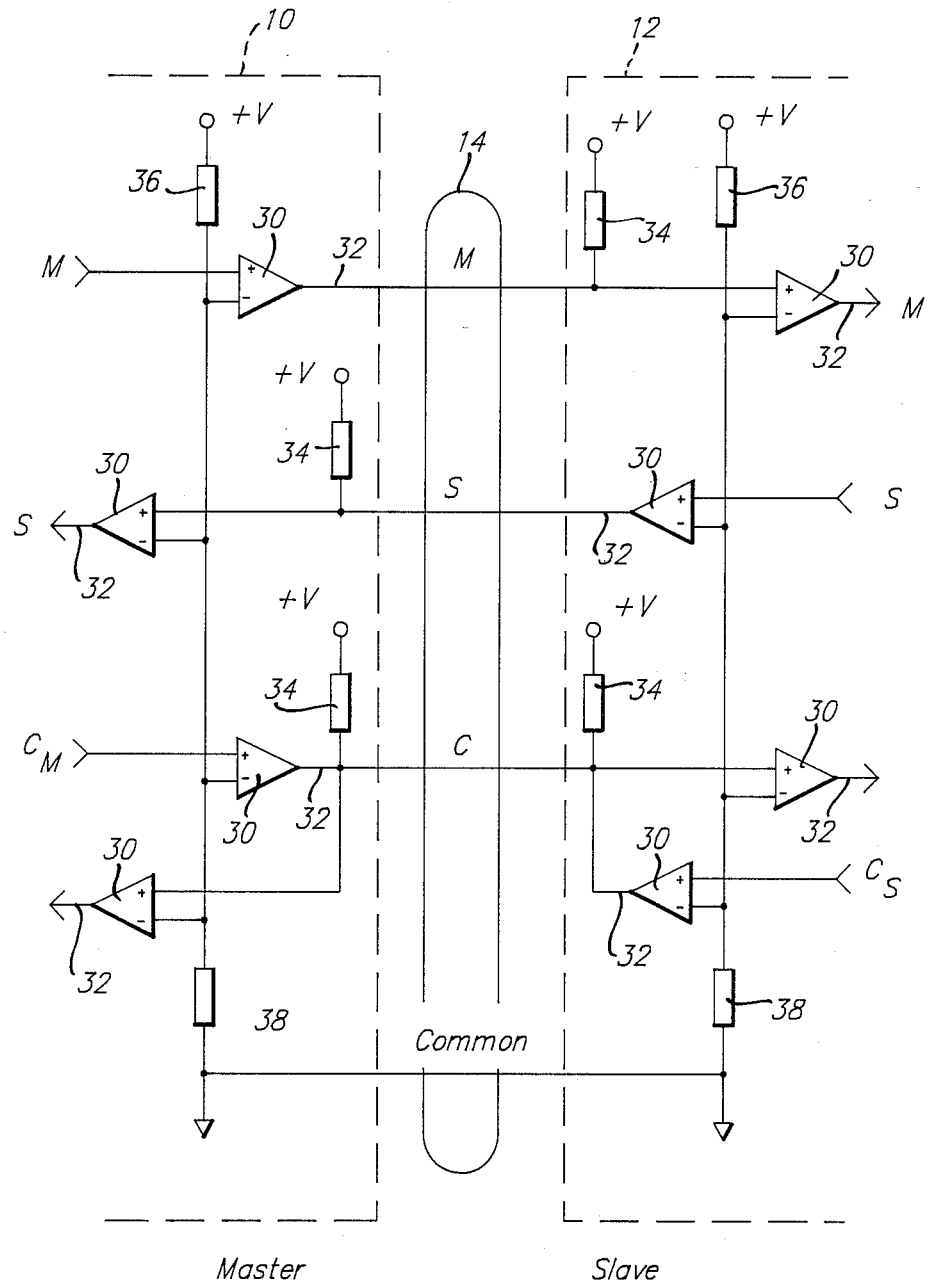
Master  Slave
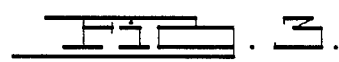

4 M YEL Master
3 S GRN Slave
2 C RED Call
1 COM BLK Common

PACS CONNECTOR

1 COM Common
2 C Call
3 S Slave
4 M Master

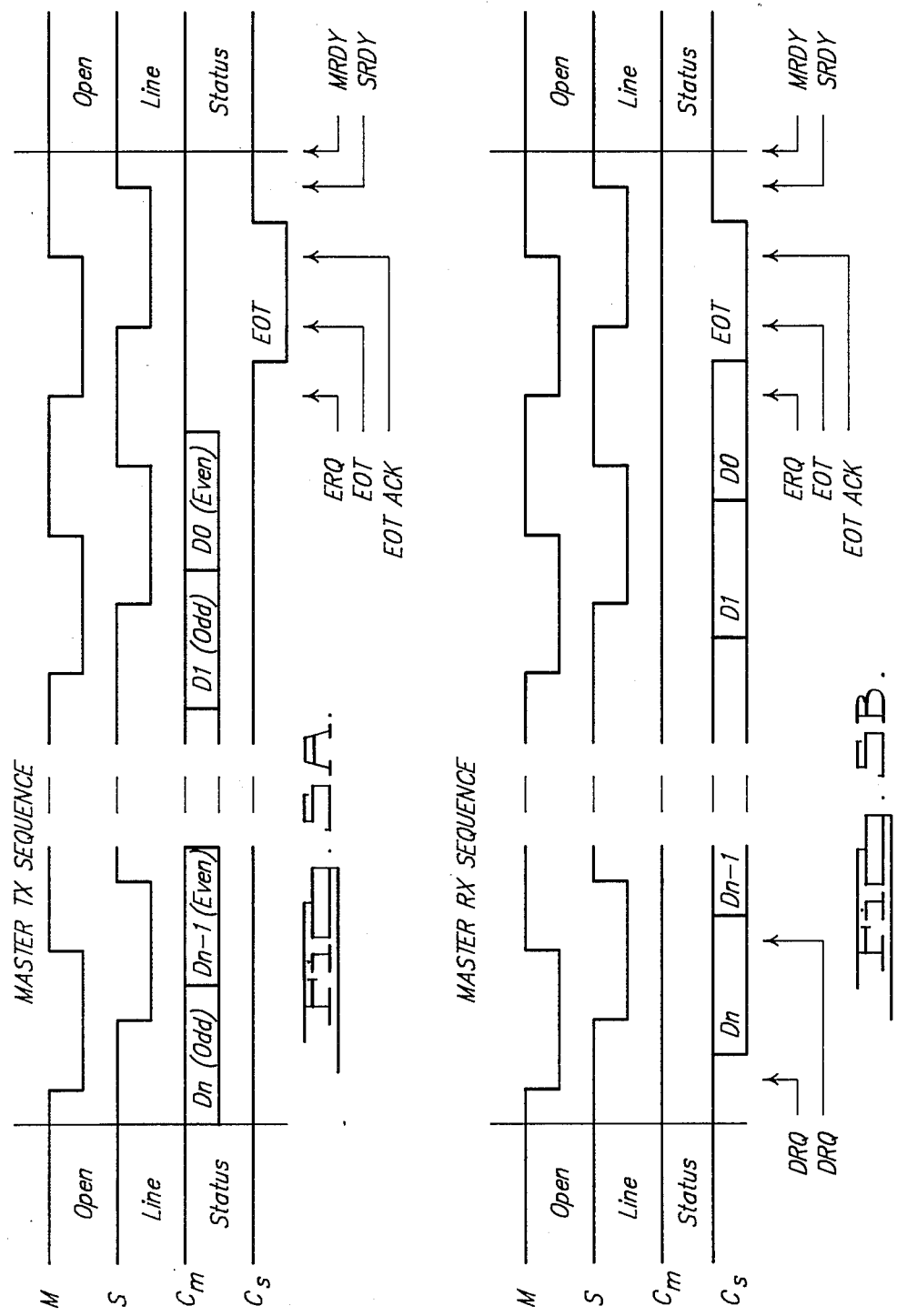

ASYNCHRONOUS COMMUNICATIONS SYSTEM

BACKGROUND AND SUMMARY OF THE INVENTION

The present invention relates generally to digital communications. More particularly, the invention relates to an asynchronous communications system which employs a three or four signal serial communications scheme for providing bidirectional transfer of data between master and slave devices.

The proliferation of digital computer equipment and peripheral equipment has given rise to a wide variety of different and incompatible communications schemes. There are the so-called RS-232 and RS-422 standards for interconnecting peripheral devices and data collection devices to computer systems. However, these schemes are far from being standards since there can be many different variations in pinout, data formats, baud rates and so forth. For example, in order to have the proper pinout to establish communication over an RS-232 line, it is necessary to know which of the data terminal equipment is originating the communication and which is receiving the communication. Furthermore, it is necessary to know the communication protocol, the number of start bits, stop bits and data bits, whether error checking is implemented, and if so whether even parity or odd parity is being used. Finally, it is also necessary to know the baud rate and whether the devices implement some form of hardware handshaking via other control lines. All of these factors add to the complexity of a communications system, often making it difficult for the end user to connect peripheral equipment to a computer system and make it work.

The present invention overcomes all of these difficulties with prior art communications schemes, making it easy for the end user to interconnect computer equipment and peripherals. The communications system of the invention eliminates the need for matching baud rates and data formats between devices. The invention enhances error detection methods to allow a transmitting device to correct errors. It eliminates timing circuits that are required by other communications schemes to synchronize bit patterns. It reduces the hardware to a minimum without hindering the performance of the communicating devices. It provides software features that can be universally applied to all communicating devices and allows for expandability of hardware and software for all applications, while maintaining compatibility at all levels of expansion. The invention maintains high speeds of communication and minimizes power requirements, cost and space of both hardware and software.

In accordance with the invention, the communications system comprises a master, a slave and a communication transmission means connecting the master and slave. The communication means, which may be a multiple wire transmission line or an electromagnetic or optical communication link, has a master line, a slave line and a call line. The master is adapted to selectively place the master line in high and low logical states. Similarly, the slave is adapted to selectively place the slave line in high and low logical states. The master and slave have protocol establishing means for enabling the master to communicate with the call line when the master line and the slave line are at the same logical state. The protocol establishing means enables the slave to communicate with the call line when the master line and the slave line are at different logical states.

For a more complete understanding of the invention and its many objects and advantages, reference may be had to the following specification and to the accompanying drawings.

BRIEF DESCRIPTION OF THE DRAWINGS

FIG. 1 is a schematic diagram illustrating the line driver circuitry in accordance with the presently preferred embodiment;

FIG. 2 is a schematic diagram of one embodiment of a line driver interface circuit in accordance with the invention;

FIG. 3 is a schematic diagram of an another embodiment of a line driver interface circuit in accordance with the invention;

FIG. 5A is a timing diagram depicting the master transmit sequence in accordance with the invention;

FIG. 5B is a timing diagram depicting the master receive sequence in accordance with the invention;

DESCRIPTION OF THE PREFERRED EMBODIMENTS

The invention is a general purpose communications system which can be used to implement digital communication between a wide variety of different computers, computer systems, peripheral devices and digital components. The invention may be used, for example, to connect a printer to a microcomputer, or to interconnect several computers into a network for file server or coprocessor applications. The invention may also be used at a more microscopic level to establish communication between processing circuits within a single microcomputer or microchip circuit.

Figure 8:
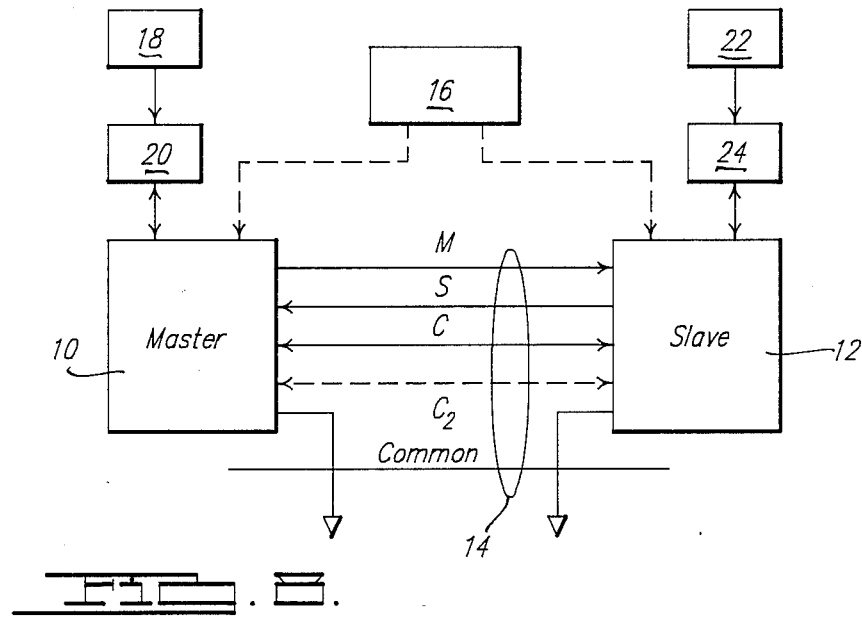
FIG. 8 is a block diagram depicting the components of the invention in an exemplary configuration.

With reference to FIG. 8, an exemplary implementation of the invention is illustrated. Communication is established between a master 10 and a slave 12 over a communication transmission medium such as a multiple wire transmission line 14. The master and slave communicate with each other using a predefined protocol which is depicted diagrammatically as protocol establishment block 16 and which may be implemented using hardware, software or both.

The master is coupled to a first digital communicating device 18 through a first encoder/decoder 20. In a similar fashion, the slave is coupled to a second digital communicating unit through a second encoder/decoder 24. The first and second digital communicating units can be any two devices, such as computers, computer systems, peripheral equipment or digitally communicating circuits which the user wishes to establish communication between. The encoders 20 and 24 can be implemented in hardware or software and convert the machine language instructions of the digital communicating unit into standardized instructions usable by the master and slave. The communications system of the invention can be made compatible with a wide variety of different, otherwise incompatible processors through the use of a standardized pseudomachine language instruction set.

In its simplest form, the transmission line 14 comprises three lines designated as the master line M, the slave line S and the call line C. These lines can be implemented using separate wires of a multiple wire transmission line. In addition, the transmission line includes a common line or wire which functions as the ground wire (common). In certain applications where great speed is required, the transmission line may also include an auxiliary call line $C_2$, which is designated in dashed lines in FIG. 8.

Master 10 and slave 12 communicate with the transmission line 14 using line driver interface circuitry illustrated in FIGS. 1, 2 and 3. The transmitter portion of the line driver circuit is an open collector output, illustrated generally within the dashed box 26 in FIG. 1. The receiver portion of the line driver circuitry is illustrated generally at 28 and comprises a pull up resistor 34. In the presently preferred embodiment, the line drivers are implemented using quad comparator integrated circuits with open collector outputs. Although other types of circuits may be used, the quad comparator is presently preferred because a single quad comparator integrated circuit can provide two outputs and two inputs and are commercially available at low cost.

FIGS. 2 and 3 illustrate the line drivers of the presently preferred implementation using quad comparators in the transmitter stages. Referring first to FIG. 2, comparator circuits 30 are illustrated on both sides of transmission line 14. In FIG. 2 transmission line 14 includes a master line M, a slave line S, a call line $C_1$ and an auxiliary call line $C_2$ as well as a common line or ground (common). Each side of the transmission line can be implemented using one quad comparator such as an LM 3302 integrated circuit, which contains four individual comparators 30. The comparators are of the open collector type and it will thus be understood that the output terminal 32 of each comparator is coupled to an open collector device as designated in the transmitter block 26 of FIG. 1. Thus the comparators 30 can be considered as comprising the transmitter circuit 26.

The receiver circuit 28 comprises resistors 34, which are configured as pull up resistors connected to the respective wires of transmission line 14 at the end of each wire opposite each output terminal 32.

One characteristic of the open collector transmitter driver circuit is that the voltage which appears at the receiver side is dependent upon the line resistance (which is in turn dependent on wire size and wire length) as well as upon the receiver's pull up resistor 34. This condition makes it difficult to match the logic level threshold required for most digital logic devices. In order to overcome this problem, the comparators in each transmitter circuit include reference resistors 36 and 38 coupled between the positive supply V+ and ground, respectively. The node between resistors 36 and 38 is connected to the inverting input of each comparator 30. The logic signal to be communicated over the transmission line is coupled to the corresponding noninverting input of each comparator. The reference resistors 38 and 36 establish a threshold level against which the signals on the noninverting input are compared. The value of resistors 38 and 37 may be adjusted to provide an appropriate threshold to ensure that logic high and logic low levels are discriminated. The output of each comparator 30 provides a signal at logic levels compatible with conventional digital equipment.

The open collector transmitter and pull up resistor receiver combination has a number of advantages. The open collector output transfers nearly all of the energy to the receiver, thereby affording a robust signal. The open collector acts as a current source which makes it suitable for long distance communications. The open collector outputs are easily connected together for bidirectional signals. Furthermore, the open collector is safe from any line shorts to the common line or to other lines of the transmission line 14.

Comparing the interface circuits of FIGS. 2 and 3, the transmitter and receiver portions of both a master 10 and a slave 12 are illustrated interconnected by a transmission line 14. The portions of the master and slave which establish the communication protocol have not been illustrated in FIGS. 2 and 3. These portions are discussed below. One principal difference between the embodiments of FIGS. 2 and 3 is that the embodiment of FIG. 2 employs two unidirectional call lines $C_1$ and $C_2$ whereas the embodiment of FIG. 3 employs one bidirectional call line C. The embodiment of FIG. 2 is useful for extremely high speed communication. Of course, the embodiments of FIGS. 2 and 3 are merely exemplary of the principles of the invention, since more lines or wires may be employed to implement greater numbers of individual call lines.

Figure 4A:
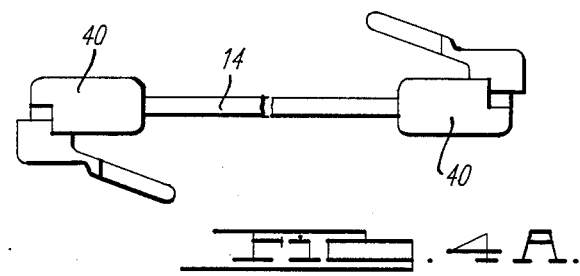
FIGS. 4A-C depict the presently preferred multiple wire transmission line terminated with modular plugs and the associated connector.
Figure 4B:
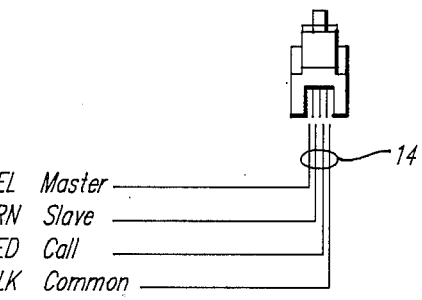
Figure 4C:
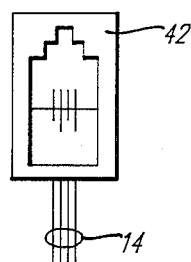

Referring to FIGS. 4A–C, the presently preferred transmission line 14 is illustrated. The transmission line illustrated is appropriate for the embodiment of FIG. 3 which employs one master line, one slave line, one call line and a common line. The transmission line illustrated in the embodiment of FIG. 2 would have five lines to accommodate the extra call line. As illustrated, the transmission line is terminated at each end using modular plugs 40 which may be of the four position, four contact type used in the telephone industry. The master and slave units have corresponding modular connectors 42 as illustrated. The modular connector system has a number of advantages including low cost and worldwide availability. The connection system is standardized in the telephone industry, thereby ensuring the longevity of the system. Cable assemblies are easily made with only a simple crimping tool and are therefore suitable for field wiring. The connectors and wiring are small, lightweight and durable and are polarized with a positive lock. The connectors can be completely recessed behind panels, if desired. In this fashion, the modular connector system standardizes the pinout requirements of the communications system. Finally, the transmission cable has good electrical characteristics: 20 pF/ft and 0.04 Ohms/ft.

The master and slave units communicate with one another using a predefined protocol which was depicted diagrammatically in FIG. 8 as protocol establishment block 16. In general, the master 10 is a device that controls the signal sequence and can transmit a control signal on the master line and can receive a control signal on the slave line. Similarly, the slave 12 is a device that responds to the control of a master 10 and which can receive a control signal on the master line and can transmit a control signal on the slave line. According to the preestablished protocol, the master always starts a communication sequence. According to the preestablished protocol, the master 10 is adapted to selectively place the master line in high and low logical states. The slave 12 is adapted to selectively place the slave line in high and low logical states. The master and slave communicate as follows. When the master line and the slave line are at the same logical state, the master 10 is enabled to control the call line. When the master line and slave line are at different logical states, the slave 12 is enabled to control the call line. In this fashion, only one of the master and slave units has control of the call line at any given time.

One advantage of this preestablished protocol is that it eliminates the need to define baud rates and eliminates timing circuits required in other communications schemes for synchronization. In conventional schemes the primary purpose of establishing a baud rate and for using timing circuits to control the baud rate is to enable the receiving side to know when to read the data signal. The present invention eliminates this problem since both master and slave are synchronized over the master and slave lines. The receiving side can signal the transmitting side after the receiving side has read the bit sent by the transmitting side. This tells the transmitting side when to send the next bit. When the next bit is sent, the transmitting side signals the receiving side so the receiving side knows when the next bit is valid. Control signals are sent from master to slave over the master line and control signals are sent from slave to master over the slave line. The invention thus achieves true asynchronous operation at the bit level. The master and slave units are conditioned to wait until each bit is received and acknowledged before the next bit is sent. In contrast, the RS-232 standard is asynchronous at the byte level but not at the bit level. Although the bytes are sent asynchronously, within each byte, the bits are sent synchronously at a rate determined by the baud rate. RS-232 communication schemes do not, for example permit the transmitter and receiver to acknowledge receipt of each individual bit as it is sent. If there is an error in the transmission of one individual bit, the RS-232 communications scheme does not detect the erroneous bit until the entire byte is sent and the parity bit is tested. The parity bit only identifies that an error in the transmission of one or more of the bits comprising the byte has occurred. It does not indicate which bits were transmitted in error. The invention, on the other hand, allows the master and slave units to check the accuracy of each bit sent, thereby allowing any erroneous transmissions to be corrected at the bit level.

Another advantage of the protocol of the invention is that it permits master and slave devices to communicate at the maximum speed automatically and without the expense and inconvenience of setting baud rates. Two devices can communicate using the invention as fast as the slower of the two devices can process the data.

The protocol established between master and slave can be implemented in either hardware or software. In many applications, the protocol can be established by preprogramming the host processor of the devices connected to the master and slave units. For example, if the communicating unit is a microcomputer, the protocol for communication can be in the form of device driver software for interfacing with the computer operating system. If the communicating unit is a printer, for example, the protocol can be preprogrammed into a read only memory ROM device to be substituted for the original equipment ROM. These are two examples of how the communications protocol can be implemented. There are others.

Having given an overview of the communications system hardware and protocol software, a more detailed description of the communications standards will now be presented. All units, whether master or slave, follow preestablished standards to ensure compatibility while allowing for expansion.

One such standard is the open line status standard. During a noncommunicating state, all outputs of either a master or a slave are at logic high level. In other words, during a noncommunicating state, the master line, the slave line and the call line are at logic high level with the corresponding open collector transmitter circuits 26 being switched off (ungrounded). This standard has two advantages. The interface circuit, with open collector circuits off, is in the lowest power consuming state. This saves energy, requires smaller power supplies and minimizes heat generation. Second, the open line status at logic high level represents the normal input state if a transmission line 14 is disconnected. This ensures that a disconnected line will be treated as a noncommunicating device.

The second standard, alluded to earlier, establishes the master control protocol. When the master line and the slave line are at the same logic state, the master may change or read a signal on the call line. Since the master always starts a communication sequence, the master waits until the slave responds by setting the slave line to the same level as the master line. This correlates with the open line status standard described above so that a master may start a communicating state by setting the master line low, the opposite state of the slave line when the sequence begins at a noncommunicating state. The slave can then respond to the master by switching the slave line to the logic low level to match the master line. As alluded to earlier, when the master line and the slave line are at opposite states, the slave may read or change the call line.

A third standard has been established to maintain organization of the data transfer between master and slave. The slave may only transmit data under two conditions. First, the slave is required to transmit an end of transmission (EOT) bit at the conclusion of every transmit sequence, described later. Second, the slave will return data to the master if the master instructs the slave to do so. When either master or slave is receiving data, the receiving side will keep its call line output high so that the state of the call line is strictly controlled by the transmitting side.

The master transmit sequence standard is illustrated in FIG. 5A. All information is transmitted in words ranging from one byte to eight bytes in length. The first byte, possibly the only byte transmitted, will always be a command byte for the slave. The first bit transmitted will always be the most significant bit (MSB) of the Command String Size (CSIZ), and second and third bit transmitted will be the least significant bits (LSB) of CSIZ. CSIZ will indicate the number of additional bytes that will follow to make a word. All information is transmitted most significant bit first and least significant bit last. By adhering to a standard format, the invention ensures compatibility. It will, of course, be recognized that other formats can also be used to implement the invention in its broader aspects as defined by the claims.

Upon receiving the last bit of a word, the slave will acknowledge by transmitting a low logic level on the call line. This signifies the end of transmission (EOT). In FIGS. 5A and 5B, the master line and slave line are designated M and S, respectively. The call line is depicted as two separate signals $C_M$ corresponding to the signals placed on the call line by the master, and $C_S$ corresponding to the signals placed on the call line by the slave. The first bit transmitted is designated Dn and the final bit transmitted is designated D0. When the master transmits or receives a data bit on the high to low transition of the master line, the data bit is defined as an odd bit. An even bit is defined as a data bit that is transmitted or received on the low to high transition of the master line. Note that a data bit is transferred on each half cycle of the master signal. In FIGS. 5A and 5B, the end of transmission signal is designated EOT. Recall that when the master line M and the slave line S are at the same logical state, the master has control of the call line. When the master line and slave line are in different logical states, the slave is in control of the call line. Thus when referring to FIGS. 5A and 5B, one can determine whether the master or slave is in control of the call line by comparing the logic levels on master line M and the slave line S.

Upon receiving acknowledgement from the slave that D0 has been received, the master will request an end of transmission by setting the call line high. In FIG. 5A, this is designated as the ERQ signal. Upon receiving the ERQ, the slave acknowledges by transmitting the EOT by setting the call line low. Upon receiving the EOT, the master will transmit an EOT ACK signal by setting the call line high. Upon receiving the EOT ACK signal, the slave will transmit a slave ready signal (SRDY) by setting the call line high. Upon receipt of the SRDY signal, the master is ready for the next communication sequence designated as MRDY in FIG. 5A. Note that MRDY corresponds to the open line status standard for a noncommunicating state which will be true of all communication sequences described hereafter.

If the transmitted word instructs the slave to return data, the master receive sequence standard depicted in FIG. 5B is used. Upon MRDY the master will request the most significant bit (MSB) first by setting the call line high, since it is receiving data, which is designated as DRQ in FIG. 5B. Upon receiving a DRQ, the slave transmits the data bit by setting the call line accordingly. Upon receiving the data bit, the master will request the next bit with another DRQ. The number of bytes returned is defined by the transmitted instruction. Upon receiving the least significant bit (LSB), designated D0, the master will transmit an ERQ by leaving the call line high. As with the master transmit sequence the slave follows with an EOT, followed by a master EOT ACK, a slave SRDY, and the sequence ends with MRDY. Upon MRDY, the master is ready for the next master transmit sequence. Note that a master receive sequence cannot follow here since that task has been completed by the slave.

The above standards define the means by which the master always maintains control of the communication sequence by signaling the slave to take information or to return data and by signaling the slave that an end of transmission has been acknowledged. The protocol also implements data verification techniques which eliminate the need for parity data and parity checking. Examining the conditions that cause the need for data verification will aid in understanding the technique implemented by the invention.

The primary condition that effects any communication signal is the capacitance that exists between wires of the transmission line. When signals change state from a low to a high, the line capacitance will have to be charged, and subsequently, high to low state changes will have to discharge the line capacitance. If the signals change state too quickly, the line capacitance will not have sufficient time to charge or discharge to the threshold level at the receiving side. In conventional communication schemes, the baud rate is intentionally lowered until signals are slow enough to charge and discharge the line capacitance. This however, must be done manually, and due to the limited selection, the baud rate may be less than optimal for the application. Unfortunately the line capacitance is not a constant, but varies with the length of the transmission line: the longer the line, the more capacitance will exist.

The invention deals most effectively with line capacitance. Since master and slave always wait for either the master line or slave line to change state before proceeding with the next bit, line capacitance merely delays the arrival of the signal at the receiving side; in other words, the baud rate is automatically reduced to the fastest possible speed for the conditions at the time. The call line exhibits an additional concern. While the master and slave signals follow a pattern of alternating states, the line capacitance will reduce the peak-to-peak level of the signals, allowing very high speed transfer of signals in spite of line capacitance. The call line, on the other hand, can exhibit any number of state changing patterns. If the data transferred was 11011, the line capacitance would have to be completely discharged on the zero bit; whereas, a data pattern of 00100 would have to completely charge the line capacitance on the one bit. This condition means that the master or slave signal may reach the receiving side before the call signal, since the master or slave signal may not have to completely charge or discharge the line capacitance.

The data verification standard has been established to insure data integrity on the call line. Referring to FIG. 3, both master and slave have an input that monitors the call line C. While receiving data, this input is used to read data transmitted from the other side. While transmitting data, this input is used for data verification. When transmitting data, the master will place a data bit onto the call line by setting the appropriate state on $C_M$. Prior to changing the state of the master line M, the master will verify the state of the call line C by reading the call line input; once the master has confirmed that the call line has the correct state, the state of the master signal M will be changed to give control of the call line to the slave. The slave performs the same steps when returning data to the master. In this way, the call line state is changed at the fastest possible speed allowable by the line capacitance. Further, since each data bit is verified, the need for parity is eliminated.

A second condition effecting communication signals is the capacitance that exists between signal wires on the transmission line. This capacitance allows state changes on one signal line to couple to another signal line causing momentary state changes that could be misinterpreted. The protocol implemented by the invention inherently ignores cross-coupled signals. When the master changes the state of the master line, a signal is coupled to the call line input and slave line input at the master side of the transmission line. At that moment in time, the master device is not monitoring its inputs and therefore does not read the coupled signal. Since the coupling takes place on the master side of the transmission line, the erroneous pulse must now transfer across the transmission line in order to affect the slave inputs. The same capacitance that creates the coupled pulse now acts to filter the pulse prior to reaching the slave. All other signals described by the protocol are generated in the same fashion as described above.

The protocol also implements many error detection techniques which are illustrated in FIGS. 6A, 6B, 6C and 6D. As with all other events, the master will control the events that occur during error conditions. Errors are detected by both master and slave, however, it is the responsibility of the master to correct the error and the slave is only required to respond in a certain fashion during error conditions.

Recall that the slave is required to transmit an end of transmission (EOT) bit at a time dictated by the instruction transmitted by the master. During power up conditions, erroneous state changes may occur on the transmission line and could falsely start a communication sequence. This would certainly confuse the slave and cause the slave to transmit the EOT at an incorrect time or possibly even begin a master receive sequence.

Regardless of what occurs, the master will basically test for two conditions: an invalid high on the call line (where the slave fails to transmit the EOT bit) and an invalid low on the call line (where the slave is either transmitting the EOT bit or returning data at an incorrect time). The slave will test for only one condition: upon receiving acknowledgement from the master that an EOT bit or a returned data bit has been received, the slave will test for an invalid low on the call line (where the master is either transmitting a zero data bit or has already started an error sequence described below).

Testing the call line brings up some concerns. To test the call line C, as shown in FIG. 3, the master must first set the $C_M$ signal to a high in order to monitor the state of the call line C as it is effected by the slave. As described earlier, line capacitance will dictate how long it will take for the call line C to reach a high state. The dilemma for the master is how long to wait for the call line to reach a high state before assuming that the slave is holding the call line low. The same dilemma exists for the slave when it is testing the call line. Recall that the invention is not recommended for transmission lines above 5,000 feet in its preferred embodiment. Considering the preferred transmission line implemented by the invention (shown in FIG. 4), the maximum amount of the time required to charge the line capacitance is 125 microseconds. This is the basis of the call line timeout standard.

The call line timeout standard establishes the means by where the master or slave can detect an invalid low on the call line. While testing the call line, an invalid low condition is assumed if the call line does not reach a logical high state within 125 microseconds. Note that this does not necessarily restrict the application to 5,000 feet; by enhancing line driver circuits (FIG. 1) to charge line capacitance faster or by using the embodiment in FIG. 2, greater distances can be achieved. In FIG. 6, the call line timeout period is designated $t_o$.

Testing the call line can require relatively long periods of time for long transmission lines. For this reason, the master will test the call line while performing data verification of a high data bit only. This eliminates the need of changing the state of the call line between two consecutive low data bits. Since the slave must respond in a certain fashion, the slave must test the call line after each bit transmitted to the master.

Figure 6A:
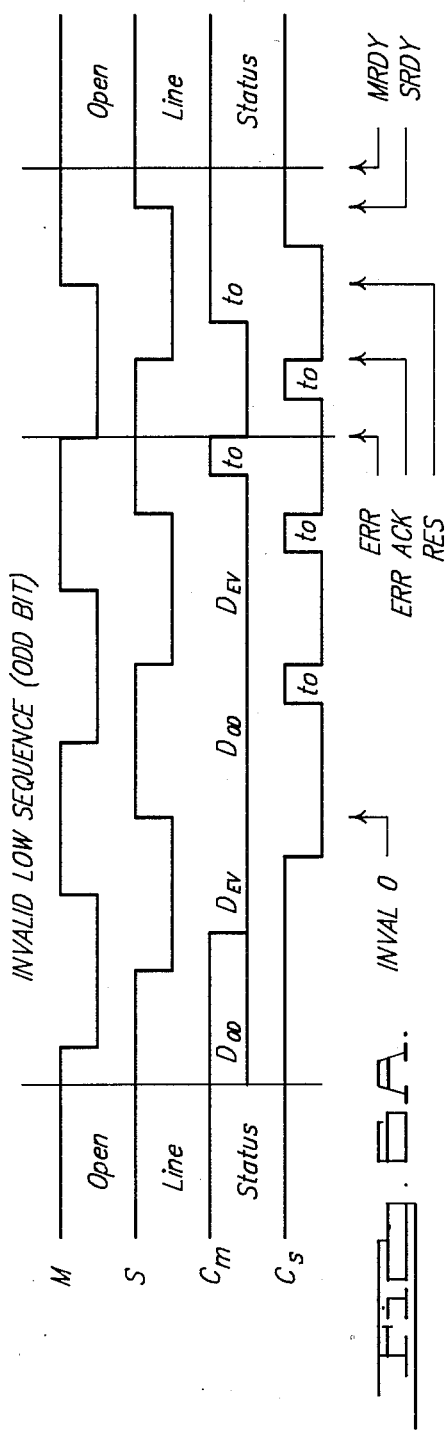
FIGS. 6A and 6B are timing diagrams depicting the invalid low error condition.
Figure 6B:
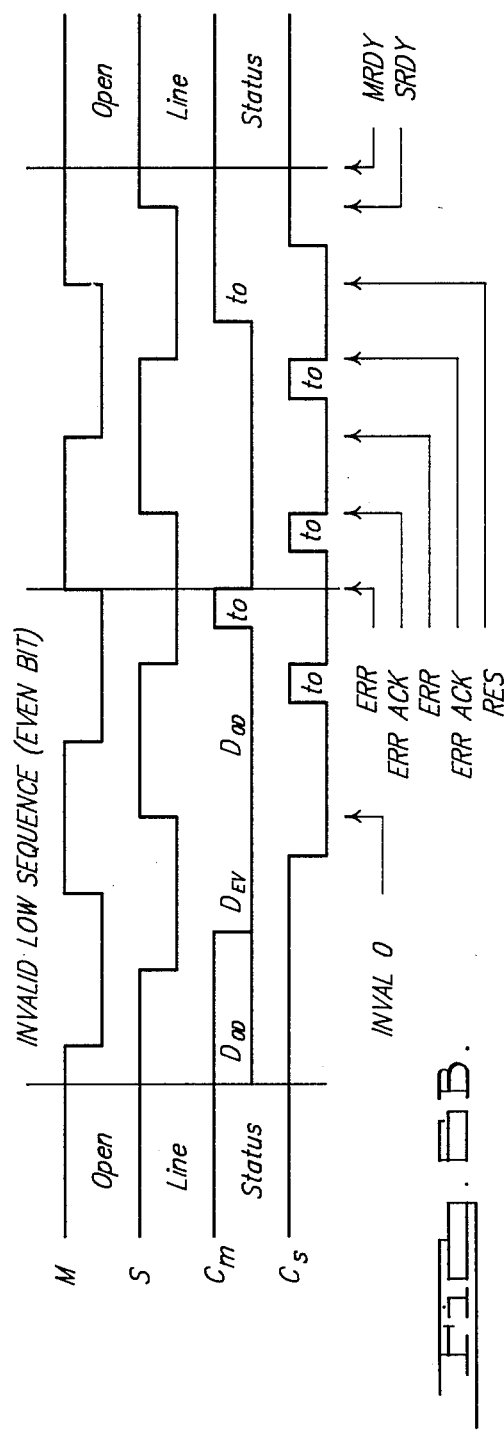

FIG. 6A depicts the invalid low sequence standard where the master detects the error on odd bit (a high to low cycle on the master line). FIG. 6B depicts the invalid low sequence standard where the master detects the error on an even bit (a low to high cycle on the master line).

Referring to FIGS. 6A and 6B, the slave places an invalid low on the call line, designated inval 0. At that time, the slave has already detected an error condition since the master is holding the call line low at a time when the slave was expecting a high (see FIG. 5). Since the master is in a transmit sequence of transmitting consecutive low data bits, designated $D_{EV}$ and $D_{OD}$, the master does not detect the error until attempting data verification of a high data bit, shown as the first $t_o$. Note that the slave has tested the call line for a logic low state, designated as $t_o$, and responds by holding the call line low until the master detects the error and eventually returns the call line high to reestablish an open line status.

Upon detecting an invalid low, the master will transmit an ERR signal. Upon receiving the ERR, the slave will respond by transmitting the ERR ACK by setting the call line low. Upon receiving the ERR ACK, the master will retransmit the ERR signal if the error was detected on an even bit (FIG. 6B). This is done so that the signals will match those shown in FIG. 6A. Upon receiving the ERR ACK, the master will transmit a RES signal, shown as the second $t_o$ on the $C_M$ signal, by setting the call line high. Upon receiving the RES, the slave responds by transmitting an SRDY signal by setting the call line high. Upon receiving the SRDY signal, the sequence ends with MRDY (open line status) and the master is ready for a master transmit sequence. The slave will ignore any instruction that resulted in an error sequence and the master may attempt the instruction again.

Figure 6C:
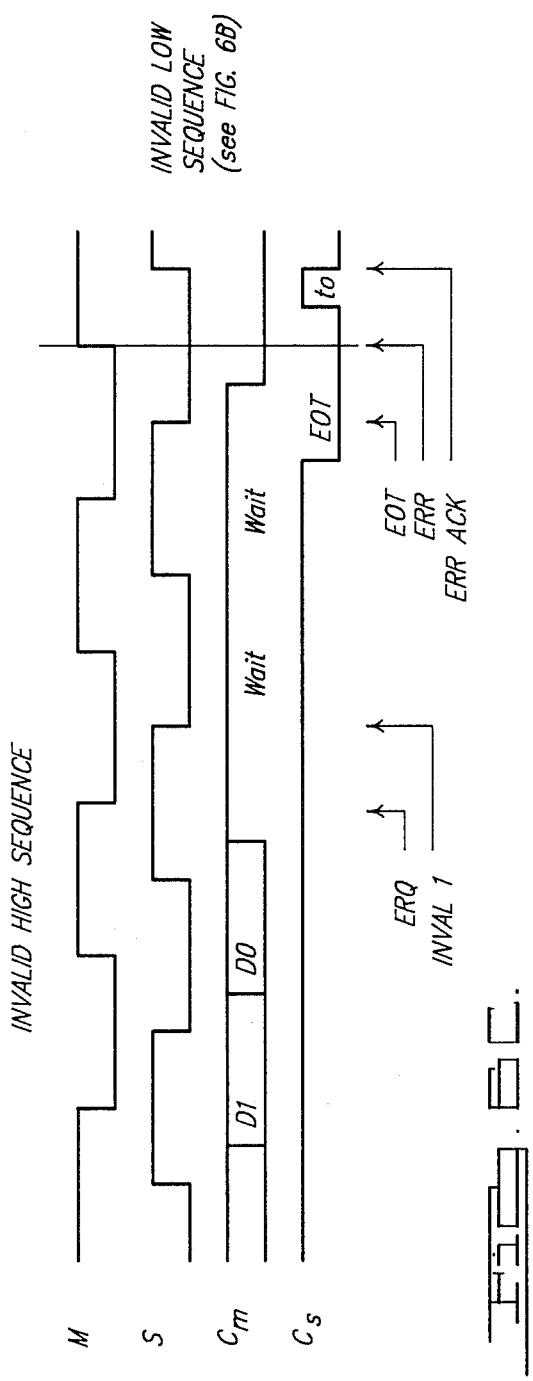
FIG. 6C is a similar timing diagram depicting the invalid high error condition.

FIG. 6C illustrates the invalid high sequence. Referring to FIG. 6C, the slave presents an invalid high on the call line at a time when the master is expecting a low, more specifically an end of transmission (EOT). At this point in time, the slave has not yet detected an error condition. The response of the master is basic: the master will continue to transmit high data bits, designated as a WAIT bit in FIG. 6C, until the slave signals an end of transmission, designated as EOT. Upon receiving the EOT, the master will now respond by performing an invalid low sequence as is shown in FIGS. 6A and 6B. Upon completion of the invalid low sequence, open line status is achieved, the slave will ignore the instruction that resulted in the error sequence, and the master may attempt to transmit the instruction again.

The error sequences described above provide the means by which the master can regain control of communications by resynchronizing the slave to the beginning of transmit sequence. However, other adverse conditions could arise where the master may not be able to reestablish open line status, such as a broken line, a shorted line, or a power loss.

Figure 6D:
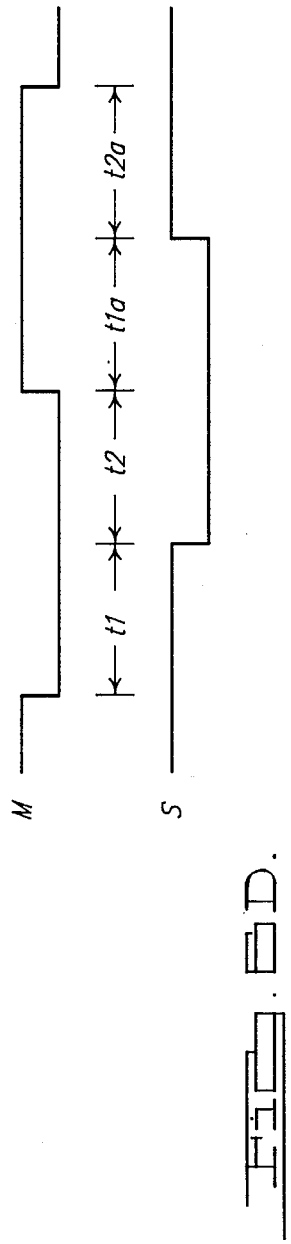
FIG. 6D depicts an offline timing diagram.
Figure 7:
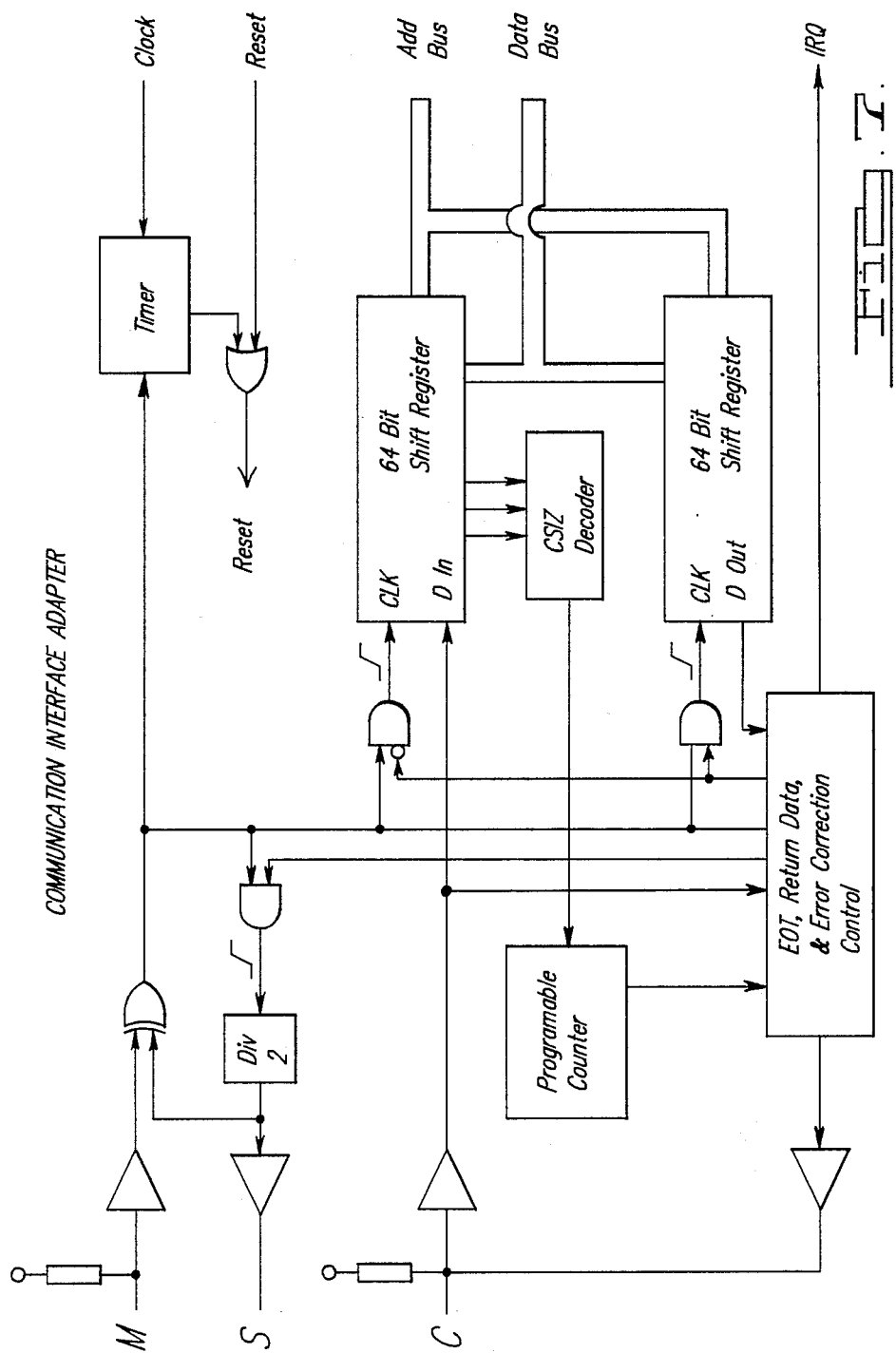
FIG. 7 is a schematic block diagram of the communication interface adaptor of the invention.

One such condition would occur if either the slave line or master line were disconnected or shorted. Since the protocol requires the slave to set the slave line to the same state as the master line during a communication sequence, a break or short on either line would eventually create a condition where the master will be waiting for the slave signal even though the slave may have responded. To deal with this problem an offline standard is implemented which is shown in FIG. 6D. Since each side could possibly wait for the other indefinitely, both master and slave devices are preprogrammed to wait a certain amount of time, specified by the communications system designer, for the other device to respond. Referring to FIG. 6D, the master changes the master line M from a high to a low state to give control of the call line to the slave (master and slave signals are at opposite states). The master will then wait for the slave line to respond with a low state, designated as $t_1$ in FIG. 6D. If $t_1$ lasts longer than the master's specified waiting period, the master will consider the slave to be offline. In this case, if the slave line was disconnected, the master would never receive a low slave signal resulting in the timeout. If the master line was disconnected, the slave would not receive the low master signal and therefore would never respond, again resulting in the timeout.

Referring to FIG. 6D, the slave changes the state of the slave line from a high to a low state to give control of the call line to the master. The slave will then wait for the master to respond with a high state, designated $t_2$ in FIG. 6D. If $t_2$ lasts longer than the slave's specified waiting period, the slave will consider the master to be offline. This condition would occur if either the master line or slave line were shorted to a low state.

It should be realized that the opposite signal conditions would be handled the same way. These are designated as time period $t_{1a}$ for the master and time period $t_{2a}$ for the slave. Referring to $t_{2a}$, note that all communication sequences described before would end with the slave line changing from a low to a high state to establish the noncommunicating state. In this case, the communicating devices have completed a sequence and the slave will ignore the timeout period.

Upon detecting an offline status, the slave will set the call line high and ignore the instruction that resulted in the offline state. The slave line will remain at the state it was at the time of the offline detection. This avoids the slave from needlessly reprocessing the offline condition in the event of a break or short. During the offline period, the slave will monitor the master line. When the state on the master line changes to the opposite state of the slave line, the slave will consider the master to be online and will set the call line low to force an invalid low sequence. This is done so that both master and slave will begin communications with a true open line status.

Upon detecting an offline status, the master will set the call line high and terminate the sequence that resulted in the offline state. The master line will remain at the state it was at the time of the offline detection. This avoids the master from needlessly reprocessing the offline condition in the event of a break or short. During the offline period, the master will monitor the slave line. When the state on the slave line changes to the same state as the master line, the master will consider the slave to be online and will begin an invalid high sequence if the call line is high, and will begin an invalid low sequence if the call line is low.

A good practice to follow when implementing the invention, is to have both master and slave devices power up in the offline state. Though this is not required, it could avoid a possible error sequence during the first instruction transmitted after power; a condition that plagues many other communication schemes.

The offline status described above is a condition that occurs when there is some difficulty with the master or slave line. When the call line is disconnected or shorted, other circumstances arise. In this case, master and slave lines will have not difficulty in changing states, so both devices will attempt communications. Reviewing FIGS. 5 and 6, it can be seen that all communication sequences will require the slave to change the state of the call line from a high to a low and return to a high state sometime during the sequence. When the slave fails to perform the required call line changes during a normal sequence (see FIG. 5), the master will first attempt an error sequence to correct the problem. However, if the call line is disconnected or shorted, the slave will not be able to perform the call line changes required for the error sequences shown in FIG. 6. When this occurs, the master will detect a sync error.

The master will detect a sync error under two conditions. First, if the call line is disconnected, the master would eventually begin an invalid high sequence. With the call line disconnected, the slave would not be able to set the call line low. Since the master is waiting for a low call line, it could wait indefinitely. The software standards implemented by the invention limit the number of bits that can be transferred during any one sequence to a maximum of 64 bits. In addition to the 64 bits of data, one additional bit period is used for end of transmission (EOT). Therefore, master will detect a sync error when an invalid high sequence lasts 65 bit periods or more.

A second sync error condition occurs when the call line is shorted. In this case, the master begins an invalid low sequence, and the slave will be unable to set the call line high for the SRDY signal shown in FIGS. 6A and 6B. At that point, the master detects the sync error.

A third condition could arise that would also result in a sync error. Referring to FIGS. 6A and 6B, the master transmits a RES signal in response to the ERR ACK signal, where the ERR ACK is a low state on the call line transmitted by the slave. If the slave were to set the call line high for the ERR ACK signal, the master will detect a sync error. This condition could occur if there is an intermittent connection or some defect in hardware or software in the slave.

Note that the slave does not detect a sync error. This is why the slave will perform no operation for command bytes that consist of all bits being high or all bits being low. Upon detecting a sync error, the master will terminate the sequence that resulted in a sync error, set the call line high, and then monitor the call line. Upon monitoring a high on the cal line, the master will begin an invalid high sequence. This is done to guard against an intermittent connection. If the master were to set the call line low, an intermittent connection would cause random high to low changes on the call line could be interpreted as a command by the slave. Note that the master may detect another sync error after starting the invalid high sequence. This process will continue until a true open line status is achieved or until the master goes offline. Upon acheiving the open line status, the master is ready to begin a master transmit sequence (see FIG. 5).

One other error condition is detected during data verification. When the master or slave is preparing to transmit a low, the device will set the call line low. The device will then test the call line for a maximum of 125 microseconds (call line timeout). If the device is unable to bring the call line low at that time, a fault condition is detected. This occurs if there is a hardware defect in the device itself or if an excessive amount of line capacitance exists. In this case the device has lost its ability to meet the standards set forth by the protocol. Upon detecting a fault condition, the device will go to the open line status condition and completely discontinue communications.

A fault condition can only be corrected by correcting the hardware failure and performing a power up sequence on the device in a fault condition.

Figure 9:
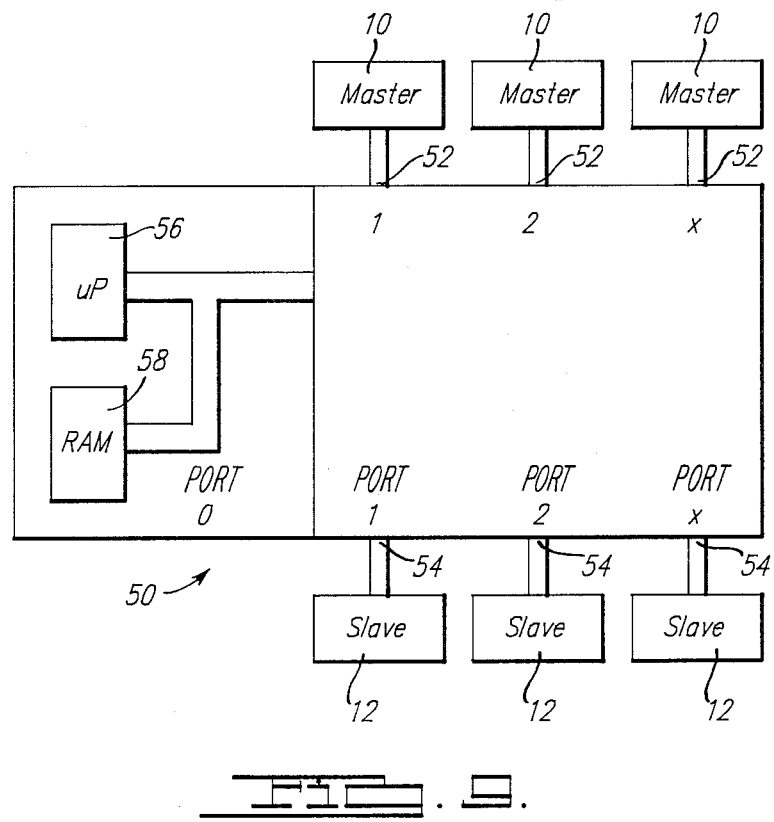
FIG. 9 is a block diagram of a system with a communications interchange in accordance with the invention.

From the foregoing, it will be understood that the present invention is capable of providing asynchronous communication between one piece of digital equipment coupled to the master and another piece of digital equipment coupled to the slave. Additional versatility can be added by use of a communications interchange device. The communications interchange device is illustrated in FIG. 9. Referring to FIG. 9, the communications interchange device 50 is coupled to a plurality of master units 10 and to a plurality of slave units 12. The master units are coupled to master ports 52, while the slave units are coupled to slave ports 54. Any of the master units 10 can communicate with the communications interchange device as if it were a slave unit. The communications interchange device emulates a slave device having several banks of memory which are accessible by issuing a port ID command to switch from one bank to another. In the communications interchange device, port zero is assigned to the microprocessor 56 of the interchange device itself. Higher port ID numbers (port 1, port 2 . . . port X) are assigned to respective slave ports 54. A master 10 may access any one of the ports by issuing a port ID command (CHAN ID) to select the desired port. The communications interchange device then relays all further commands to the selected port and thus to the selected slave unit. By accessing port zero, any master can access the memory 58 of the interchange device, to alter or monitor key information on the status of the various slave units that are accessible. This allows the master devices to communicate more efficiently without communicating with a slave device directly. In instances where two master units need to exchange information, the interchange device can be designed to allocate memory in port zero where both master units have a common access point. In more elaborate systems, one of the slave devices can be configured as a common database that is also accessible to both master units. The interchange device makes reconfiguring a system quite easy. If a slave unit is reconnected to another port, the master will only require reprogramming to the extent of changing the single port ID command that enables it to specify the particular slave unit in question.

The invention further comprises multiplexing techniques. A multiplexer is a form of slave unit which communicates with at least one master and at least one other slave unit. The master can send commands to the multiplexer slave causing it to transmit information to one of the other slave units connected to it. Unlike the interchange device which routes communications automatically after receiving a port ID command, the multiplexer slave handles the communication process in response to explicit instructions from the master unit. The multiplexer slave may be used in applications where a port ID command needs to be sent from a master to a slave unit. The interchange device described above would not be able to transmit a port ID command through to a slave unit, since it would interpret the port ID command as an instruction for itself. To overcome this problem, the interchange device may have multiplexing slave features that are programmable by accessing port zero. In this way, the master can access port zero to communicate with the multiplexing slave being emulated in the memory 58.

Having thus described the various hardware elements of the invention, a description of the system software will now be given. In order to be compatible with a wide variety of different digital communications systems, the software is constructed to interface directly with the microprocessors of digital communicating devices. This enables the system software and hardware to become an extension of the communicating device's microprocessor. The master unit initiates commands in the same manner as an application program does which runs on the communicating unit's microprocessor, with the master controlling the instructions and their sequence. The slave unit also executes commands in the same manner that its associated microprocessor does. The slave unit is treated as an extension to the master unit's memory, where data can be stored, changed or read.

The presently preferred software adopts the following format. First, a command byte or instruction is transmitted to the slave unit. Second, depending upon the command, the master unit will further transmit an address which indicates the location of the target data. Data may be transmitted to the slave which is to be used according the command byte previously sent. In the alternative, the slave may return data if the command byte so indicates. A standardized instruction set for accomplishing the change memory, read memory and perform operations on data functions comprises a compact and yet versatile set of operations which are set forth in Table I below. The instruction set features 8, 16 and 32 bit data modes, which allows multiple eight bit operations to be reduced to a single command. This also allows 8, 16 and 32 bit microprocessors to be readily adapted to the system software. An indirect addressing mode is also provided. In the indirect addressing mode, the slave unit maintains a memory pointer that increments in the same manner as a stack pointer does for a microprocessor. In order to handle open line, shorted line and intermittent line conditions, command bytes consisting of all high bits or all low bits are treated as a no operation (NOP) by the slave unit. It will be understood that the all high or all low conditions may occur when a transmission line is open, shorted or intermittent. Hence the software is conditioned to ignore these events. In order to provide an upward path for expansion while maintaining compatibility, the slave units treat any command byte which is not a part of its command instruction set as a no operation. This allows the system software to be upgraded with additional commands without interfering with the operation of preexisting slave software. In addition, a command byte with the five least significant bits being either 00000 or 00001 will indicate that the next following byte or bytes are additional command bytes. In this fashion, additional commands can be added to the instruction set.

TABLE I

| | System Software Instruction Set | | | |
|---|---|---|---|---|
| | PACS Code | ASCII | Data Mode | Address Mode |
| A | 64 | ASa,d | SING | DIR |
| | 84 | ADa,d | DOUB | DIR |
| | C4 | AQa,d | QUAD | DIR |
| Add | 25 | AS,d | SING | IND |
| | 45 | AD,d | DOUB | IND |
| | 85 | AQ,d | QUAD | IND |
| AN | 68 | ANSa,d | SING | DIR |

TABLE I-continued

System Software Instruction Set

|  | PACS Code | ASCII | Data Mode | Address Mode |
|---|---|---|---|---|
|  | 88 | ANDa,d | DOUB | DIR |
| And | C8 | ANQa,d | QUAD | DIR |
|  | 29 | ANS,d | SING | IND |
|  | 49 | AND,d | DOUB | IND |
|  | 89 | ANQ,d | QUAD | IND |
| C | 62 | CSa,d | SING | DIR |
|  | 82 | CDa,d | DOUB | DIR |
| Change | C2 | CQa,d | QUAD | DIR |
|  | 23 | CS,d | SING | IND |
|  | 43 | CD,d | DOUB | IND |
|  | 83 | CQ,d | QUAD | IND |
| D | 58 | DSa | SING | DIR |
|  | 59 | DDa | DOUB | DIR |
| Decr | 5A | DQa | QUAD | DIR |
|  | 18 | DS | SING | IND |
|  | 19 | DD | DOUB | IND |
|  | 1A | DQ | QUAD | IND |
| EO | 6C | EOSa,d | SING | DIR |
|  | 8C | EODa,d | DOUB | DIR |
| Ex Or | CC | EOQa,d | QUAD | DIR |
|  | 2D | EOS,d | SING | IND |
|  | 4D | EOD,d | DOUB | IND |
|  | 8D | EOQ,d | QUAD | IND |
| I | 54 | ISa | SING | DIR |
|  | 55 | IDa | DOUB | DIR |
| Incr | 56 | IQa | QUAD | DIR |
|  | 14 | IS | SING | IND |
|  | 15 | ID | DOUB | IND |
|  | 16 | IQ | QUAD | IND |
| OR | 6A | ORSa,d | SING | DIR |
|  | 8A | ORDa,d | DOUB | DIR |
| or | CA | ORQa,d | QUAD | DIR |
|  | 2B | ORS,d | SING | IND |
|  | 4B | ORD,d | DOUB | IND |
|  | 8B | ORQ,d | QUAD | IND |
| R | 50 | RSa,# | SING | DIR |
|  | 51 | RDa,# | DOUB | DIR |
| Read | 52 | RQa,# | QUAD | DIR |
|  | 10 | RS,# | SING | IND |
|  | 11 | RD,# | DOUB | IND |
|  | 12 | RQ,# | QUAD | IND |
| S | 66 | SSa,d | SING | DIR |
|  | 86 | SDa,d | DOUB | DIR |
| Sub | C6 | SQa,d | QUAD | DIR |
|  | 27 | SS,d | SING | IND |
|  | 47 | SD,d | DOUB | IND |
|  | 87 | SQ,d | QUAD | IND |
| XX | 3C | 0–255 |  |  |
|  | 3D | 256–511 |  |  |
| Chan ID | 3E | 512–767 |  |  |
|  | 3F | 768–1023 |  |  |
| — | 00 |  |  |  |
|  | FF | +7 Bytes |  |  |
| NOP | NO | No ASCII |  |  |

While the present invention has been described in connection with its presently preferred embodiments, it will be understood that the invention is capable of certain modification and change without departing from the spirit of the invention as set forth in the appended claims.

What is claimed is:

1. A communications system comprising:
   a master;
   a slave;
   a communication transmission means connecting said master and said slave, the communication means having a master channel, a slave channel and a call channel, said master channel, said slave channel and said call channel each being separate and logically distinct;
   said master having circuit means to selectively place said master channel in high and low logical states;
   said slave having circuit means to selectively place said slave channel to high and low logical states;
   said master and slave having protocol establishing means for enabling said master to control said call channel when said master channel and said slave channel are at a first logical relationship to one another, and for enabling said slave to control said call channel when said master channel and said slave channel are at a second logical relationship to one another.

2. The communications system of claim 1 wherein said communication transmission means comprises a multiple wire transmission channel and wherein said master channel, said slave channel and said call channel each comprise a wire of said transmission channel.

3. The communications system of claim 1 wherein said communication transmission means comprises a four conductor cable.

4. The communications system of claim 3 wherein a first one of said conductors comprises said master channel, a second one of said conductors comprises said slave channel, a third one of said conductors comprises said call channel and a fourth one of said conductors comprises a common channel.

5. The communications system of claim 3 wherein said cable is terminated at at least one end by a modular-type plug.

6. The communications system of claim 1 wherein said master comprises at least one transmitter circuit having a pull down means for generating said logical low state.

7. The communications system of claim 1 wherein said slave comprises at least one transmitter circuit having a pull down means for generating said logical low state.

8. The communications system of claim 1 wherein said master comprises at least one receiver circuit having a pull up means for generating said logical high state.

9. The communications system of claim 1 wherein said slave comprises at least one receiver circuit having a pull up means for generating said logical high state.

10. The communications system of claim 6 wherein said pull down means comprises an open collector logic circuit.

11. The communications system of claim 7 wherein said pull down means comprises an open collector logic circuit.

12. The communications system of claim 1 wherein said master comprises at least one receiver circuit having conditioning means responsive to said high and low logical states on one of said channels for providing a conditioned signal of the same logical state.

13. The communications system of claim 1 wherein said slave comprises at least one receiver circuit having conditioning mean responsive to said high and low logical states on one of said channels for providing a conditioned signal of the same logical state.

14. The communications system of claim 12 wherein said conditioning means comprises a comparator for comparing the high and low logical states on said one of said channels with a predetermined reference level and for providing said conditioned signal of the same logical state.

15. The communications system of claim 13 wherein said conditioning means comprises a comparator for comparing the high and low logical states on said one of said channels with a predetermined reference level and for providing said conditioned signal of the same logical state.

16. The communications system of claim 1 wherein said master comprises at least one transmitter circuit having conditioning means receptive of an input signal of high and low logical states for providing a conditioned signal to one of said channels of the same logical state as said input signal.

17. The communications system of claim 1 wherein said slave comprises at least one transmitter circuit having conditioning means receptive of an input signal of high and low logical states for providing a conditioned signal to one of said channels of the same logical state as said input signal.

18. The communications system of claim 16 wherein said conditioning means comprises a comparator for comparing said input signal with a predetermined reference level and for providing said conditioned signal of the same logical state.

19. The communications system of claim 17 wherein said conditioning means comprises a comparator for comparing said input signal with a predetermined reference level and for providing said conditioned signal of the same logical state.

20. The communications system of claim 1 further comprising a second slave connected to said communication transmission means and an interchange means for coupling to said communication transmission means and responsive to said master for selectively transferring said logical state on at least one of said channels to at least one of said slaves.

21. The communications system of claim 1 wherein said protocol establishing means establishes a noncommunicating state in which said master channel and said slave channel are in a high logical state.

22. The communications system of claim 1 wherein said call channel is a bidirectional communication line.

23. The communications system of claim 1 wherein said master and slave each include a time out means for causing said master and slave to assume noncommunicating state after a predetermined period of inactivity.

24. The communications system of claim 1 wherein said master effects transitions to selectively place said master channel in said high and low logical states and wherein information is conveyed over said call channel in synchronism with said transitions of said master channel.

25. The communications system of claim 1 wherein said master effects transitions to selectively place said master channel in said high and low logical states and wherein information is conveyed over said call channel in synchronism with each of said transitions of said master channel.

26. The communications system of claim 1 wherein said communication transmission means has a natural transmission delay and wherein information is conveyed over said call channel at a baud rate determined automatically by said natural transmission delay of said communication transmission means.

27. The communications system of claim 1 further comprising means for automatically determining baud rate comprising first and second communicating devices having different communication rates attached to said master and slave and wherein information is conveyed over said call channel at a baud rate determined automatically by the communication rate of the slower of said first and second communicating devices.

28. The communications system of claim 1 further comprising means for automatically determining baud rate wherein information is conveyed over said call channel in bits of data and wherein information is conveyed over said call channel at a baud rate determined automatically and updated with each bit transmitted.

29. The communications system of claim 1 further comprising error detecting means for transferring an end of transmission signal between master and slave and for thereby detecting transmission errors characterized by a loos of synchronization between said master and slave.

30. The communications system of claim 1 further comprising error detecting means for detecting sync errors characterized by one of said master and slave being unable to synchronize with the other of said master and slave.

31. The communications system of claim 1 further comprising error detecting means for monitoring the time between changes in said logical states of said master and slave channels for thereby detecting offline conditions characterized by one of said master and slave stopping communication during a communications sequence.

32. The communications system of claim 1 further comprising error detecting means for monitoring the logical state of said call channel and for thereby detecting fault conditions characterized by hardware failure.

33. The communications system of claim 1 wherein at least one of said master and slave comprises at least a portion of an integrated microcircuit.

34. The communications system of claim 1 wherein at least one of said master and slave comprises at least a portion of a microprocessor.

35. The communications system of claim 1 wherein at least one of said master and slave comprises at least a portion of a microprocessor which serves as a communications coprocessor coupled to a second microprocessor within a communicating device.

36. A communications system comprising:
   a master;
   a slave;
   a communication transmission means connecting said master and said slave, the communication means having a master channel, a slave channel and a call channel, said master channel, said slave channel and said call channel each being separate and logically distinct;
   said master having circuit means to selectively place said master channel in high and low logical states;
   said slave having circuit means to selectively place said slave channel in high and low logical states;
   said master and slave having protocol establishing means for enabling said master to control said call channel when said master channel and said slave channel are at the same logical state, and for enabling said slave to control said call channel when said master channel and said slave channel are at different logical states.

37. A master/slave communications system for asynchronous transfer of binary bits between a master and a slave, comprising:
   a communication transmission means connecting said master and said slave, the communication means having a master channel, a slave channel, and a call channel;
   a master protocol establishing means for enabling said master to selectively place said master channel in high and low logical states to control the transfer of binary bits on the said call channel;

a slave protocol establishing means for enabling said slave to selectively place said slave channel in high and low logical states in response to said master protocol;

a master/slave protocol establishing means for enabling said master to control said call channel when said master channel and said slave channel are at a first logical relationship to one another, and for enabling said slave to control said call channel when said master channel and said slave channel are at a second logical relationship to one another.

38. A master/slave communications system for asynchronous transfer of binary bits between a master and a slave, comprising:

a communication transmission means connecting said master and said slave, the communication means having a master channel, a slave channel, and a call channel;

a master protocol establishing means for enabling said master to selectively place said master channel in high and low logical states to control the transfer of binary bits on the said call channel;

a slave protocol establishing means for enabling said slave to selectively place said slave channel in high and low logical states in response to said master protocol;

a master/slave protocol establishing means for enabling said master to control said call channel when said master channel and said slave channel are at the same logical state, and for enabling said slave to control said call channel when said master channel and said slave are at different logical states.

* * * * *

UNITED STATES PATENT AND TRADEMARK OFFICE
CERTIFICATE OF CORRECTION

PATENT NO. : 4,803,481

DATED : February 7, 1989

INVENTOR(S) : Peter W. Mueller et al.

It is certified that error appears in the above-identified patent and that said Letters Patent is hereby corrected as shown below:

Column 2, line 15, after "of" delete "an".

Column 3, line 68, after "and" delete "37" and insert -- 36 --.

Column 12, line 1, after "have" delete "not" and insert -- no --.

Column 12, line 47, after "the" delete "cal" and insert -- call --.

Column 12, line 51, after "line" insert -- that --.

Column 16, line 2, Claim 1, after "channel" delete "to" and insert -- in --.

Column 18, line 11, Claim 29, after "a" delete "loos" and insert -- loss --.

Signed and Sealed this

Nineteenth Day of September, 1989

Attest:

*Attesting Officer*

DONALD J. QUIGG

*Commissioner of Patents and Trademarks*